(12) United States Patent
Huh

(10) Patent No.: US 9,566,557 B2
(45) Date of Patent: Feb. 14, 2017

(54) HOT (OR WARM) MIX ASPHALT PLANTS CAPABILITY OF PRODUCING UP TO 100 PERCENT RAP (OR ARS) RECYCLED ASPHALT MIXES

(71) Applicant: Jung Do Huh, West Jordan, UT (US)

(72) Inventor: Jung Do Huh, West Jordan, UT (US)

(*) Notice: Subject to any disclaimer, the term of this patent is extended or adjusted under 35 U.S.C. 154(b) by 0 days.

(21) Appl. No.: 15/076,379

(22) Filed: Mar. 21, 2016

(65) Prior Publication Data

US 2016/0199799 A1   Jul. 14, 2016

Related U.S. Application Data

(63) Continuation-in-part of application No. 14/954,085, filed on Nov. 30, 2015.

(Continued)

(51) Int. Cl.

| | |
|---|---|
| B28C 5/46 | (2006.01) |
| B01F 9/00 | (2006.01) |
| E01C 19/10 | (2006.01) |
| B01F 7/04 | (2006.01) |
| B01F 13/00 | (2006.01) |
| B01F 15/06 | (2006.01) |
| B28C 5/20 | (2006.01) |
| B01F 13/10 | (2006.01) |
| B01F 7/08 | (2006.01) |

(52) U.S. Cl.
CPC ............. *B01F 9/001* (2013.01); *B01F 7/04* (2013.01); *B01F 7/08* (2013.01); *B01F 13/0035* (2013.01); *B01F 13/1016* (2013.01); *B01F 15/065* (2013.01); *B28C 5/2036* (2013.01); *B28C 5/466* (2013.01); *E01C 19/1036* (2013.01); *E01C 2019/109* (2013.01); *E01C 2019/1086* (2013.01)

(58) Field of Classification Search
CPC .... B28C 5/466; B28C 5/2036; B28C 13/1025; B28C 13/1036; B01F 9/001; B01F 9/0012; B01F 13/1025; B01F 13/1036; E01C 19/1036; E01C 19/1027; E01C 19/1031; B05C 3/08
USPC ..................... 366/24, 25, 146, 147
See application file for complete search history.

(56) References Cited

U.S. PATENT DOCUMENTS

| | | | | |
|---|---|---|---|---|
| 4,427,376 A | * | 1/1984 | Etnyre | E01C 7/267 366/25 |
| 5,052,810 A | * | 10/1991 | Brock | E01C 19/1036 366/25 |

(Continued)

FOREIGN PATENT DOCUMENTS

DE            10246639 A1 *   4/2004    .............. B01F 7/047

*Primary Examiner* — Charles Cooley
(74) *Attorney, Agent, or Firm* — Dobbin IP Law; Geoffrey E. Dobbin

(57) ABSTRACT

A hot mix asphalt (HMA) or warm mix asphalt (WMA) plant features material transfer by shear action of segmented screws and directional flights standing on an inner drum. Indirect convective material heating is initiated by a heating source located inside of the inner drum. Material mixing, heating, melting, and uniform coating, all take place as a single simultaneous process. As the result of processing, regular HMA (or WMA) or up to 100% RAP (or ARS) recycled HMA (or WMA) can be produced. Many heat sources, such as a conventional oil burner and the surface combustion burner, may also be utilized in the plant. The plant may be combined with paving units for an integrated, mobile paving system.

19 Claims, 11 Drawing Sheets

Related U.S. Application Data

(60) Provisional application No. 62/123,866, filed on Dec. 1, 2014.

(56) References Cited

U.S. PATENT DOCUMENTS

| | | | | |
|---|---|---|---|---|
| 5,417,492 | A * | 5/1995 | Christian | C10B 47/44 219/388 |
| 7,384,181 | B1 * | 6/2008 | Collette | E01C 19/1004 366/147 |
| 7,566,162 | B1 * | 7/2009 | Swanson | C08L 95/00 366/15 |
| 7,993,048 | B1 * | 8/2011 | Collette | E01C 19/1031 366/147 |
| 2016/0199799 | A1 * | 7/2016 | Huh | B01F 9/001 366/24 |

* cited by examiner

| FIGURE 14A | FIGURE 14B |
|---|---|

HOT (OR WARM) MIX ASPHALT PLANTS CAPABILITY OF PRODUCING UP TO 100 PERCENT RAP (OR ARS) RECYCLED ASPHALT MIXES

CROSS-REFERENCES TO RELATED APPLICATIONS

This Application claims priority as a continuation-in-part of prior filed U.S. nonprovisional application Ser. No. 14/954,085, filed Nov. 30, 2015, now abandoned, which is in turn a non-provisional perfection of prior filed application No. 61/123,866, filed Dec. 1,2014, and incorporates these applications by reference in their entirety 10 herein.

TECHNICAL FIELD

The present invention relates to the field of asphalt mix production and more specifically relates to a plant producing up to 100% recycled mixes of reclaimed asphalt pavements (RAP) and asphalt roof shingles (ARS) and their mixtures as well as 100% virgin asphalt mixes as the final product.

BACKGROUND ART

The present invention is about a next-generation hot mix asphalt (HMA) or warm mix asphalt (WMA) producer that is the main unit in the innovative next generation asphalt plant whose processing mechanism excels over any other existing asphalt plants available nowadays. It should be noted that principles of this invention apply both to HMA and WMA material. Therefore, for purposes of this Application, and unless otherwise noted, the term HMA should also be understood to include WMA. Likewise, the terminology RAP used hereafter also contains ARS.

The existing HMA plant has the following common units. Cold bins and belt conveyors supply virgin aggregates to the hopper of the mixing drum (or a producer). A mixing drum is the main unit that produces HMA product. A conventional burner consuming oil fuel generates the horizontal hot air stream along the mixing drum. The horizontal hot air stream that passes through cold aggregates circularly spraying down from the top toward the bottom, heats each cold aggregate. During this passage, the horizontal hot air stream picks up substantial amount of dust falling down with aggregates. Dust collector units facilitated at the end of the mixing drum eliminate most of dust before discharge of the hot air stream into the ambient air. Pocket flights attached on the inside of the mixing drum, initially transfer cold aggregates forward in the hot air stream for heating, by making aggregates circularly tumbled. The circular tumbling is caused by rotation of the inclined mixing drum. Heating of aggregates in this manner take place in the heating zone of the mixing drum, and then heated aggregates reach in the mixing zone. A RAP adding equipment inputs RAP at the mixing zone usually located at the almost end portion of the mixing drum, and, at the same time, a hot asphalt binder from asphalt storage tank are also sprayed into the same mixing zone. Heated virgin-aggregates and cold RAP-aggregates, and the hot asphalt binder meet at the mixing zone and mix together to produce HMA product at a given high temperature (usually 160° C.). A storage silo stores the well-mixed HMA transferred from the exit of the drum mixer by a belt conveyor, before loading into the dump truck that carries HMA on the construction site. Note that, at the mixing zone, the cold RAP begins to receive heat upon contacting both heated virgin aggregates and hot asphalt binders by exchanging heat each other, and the total mix gradually reaches the uniformly high mix temperature (160° C.). Thus, the amount of cold RAP input cannot exceed more than 50% of the total mix due to heat exchange requirement. The 30% RAP use is the common practice instead of 50% in the present RAP recycling industry. This is the one of the major limitations to be resolved immediately in the existing HMA plants.

The structure of existing asphalt mixing plants contains many technical limitations that need resolution. The following sentences explain those limitations. (1) Use of a general oil burner causes incomplete combustion that evolves air pollutant gases. (2) Simple mixing obtained by tumbling of materials in the mixing zone results to mediocre mix quality of HMA produced. (3) Addition of RAP in the mixing zone usually producing inferior HMA quality due to not enough heating time and heating energy that could make early damage of asphalt pavements (rutting, fatigue cracking, potholes, etc.). (4) Preventing dust generation is impossible under this process such that dust collectors are essential in removing dusts from the exhausting air. (5) Some fine dusts and blue smokes still escape from the dust collectors and contaminate the ambient air. (6) Limitation of the maximum RAP-recycling ratio is less than 50%, but usual practice is 15-30%.

Researchers have tried to remove limitation of the present maximum RAP recycling ratio of less than 50% and increase it up to 100% as claimed by U.S. Pat. Nos. 5,520,342, and 7,669,792. In U.S. and Europe, many companies have invested substantial money to develop the new HMA plant that is capable of 100% RAP recycling. Such HMA plants are reviewed by M. Zaumanis, R. B. Mallick & R. Frank in their work "100% Recycled Hot Mix Asphalt: A Review and Analysis," (Elsevier, Resources, Conservation & Recycling, 92(2014), pp. 230-245). Most of these plants face on limitations listed in the following.

(1) Insufficient heating energy provided by the conventional oil burner or oil pipes fails to produce good quality of HMA. Heating energy is not sufficient due to parallel heating along the material passage and indirect heating of multiple particles (compared to direct heating of an individual particle in the existing plant) in spite of 3-times more heating energy required for 100% RAP heating than the regular virgin aggregate heating as shown in TABLE 1. Note in TABLE 1 that comparison of heating energy requirement among different materials is to compare the heat diffusivity among materials, because heat diffusivity represents the combined effect of the heat conductivity and the capacity. Since average heat diffusivity of granite aggregate is 3.28 times higher than the asphalt mix (or RAP), heating RAP requires 3.28 times more energy required compared to the heating virgin aggregates to get the same temperature. This means that the heating energy of the oil burner used in the 100% RAP recycling plant should be 3.28 times higher than heating energy of the virgin aggregates. Also the parallel heating along the material passage in all those 100% RAP recycling plants provides a lot less efficient compared to the perpendicular heating on materials. Also the indirect heating of multiple RAP particles requires more energy compared to the direct heating of an individual particle in the existing plant. All these heating factors negatively affect the success of the 100% RAP recycling plants developed so far. Use of the higher heating energy burner and design of the efficient heating system are prerequisite for successful development of the 100% RAP recycling process.

TABLE 1

| Materials | Ref. No | Heat Conductivity k (W/m/°K) | | Heat Capacity $C_p$ (KJ/Kg/°K) | | Density ρ (Kg/m³) | | Heat Diffusivity α × 10⁶ (m²/s) | |
|---|---|---|---|---|---|---|---|---|---|
| RAP or Asphalt Mixes | 1 | 0.75 | Av = 1.05 (1) | 0.920 | Av = 0.99 (1) | 2300 | Av = 2320 (1) | 0.35 | Av = 0.46 (1) |
| | 2 | 0.7-1.4 (1.05) | | 1.27 | | 2300 | | 0.36 | |
| | 3 | 0.8-1.06 (0.93) | | 0.85-0.87 (0.86) | | 2400 | | 0.37-0.53 (0.45) | |
| | 4 | 1.21 | | 0.92 | | 2300 | | 0.57 | |
| | 5 | 1.21-1.38 (1.30) | | 0.84-1.09 (0.97) | | 2300 2300 | | 0.58 0.58 | |
| Granite Aggregate | 1 | 1.7-4.0 (2.85) | Av = 2.83 (2.7) | 0.79 | Av = 0.80 (0.8) | 2350 | Av = 2350 (1.01) | 1.535 | Av = 1.51 (3.28) |
| | 6 | 2.813 | | 0.816 | | 2350 | | 1.467 | |
| Carbon Steel | 1 | 43 | Av = 50.0 (47.6) | 0.466 | Av = 0.47 (0.47) | 7873 | Av = 7852 (3.38) | 11.72 | Av = 14.86 (32.3) |
| | 7 | 45-68 (56.5) | | 0.44-0.5 | | 7830 | | 18.0 | |

1. www.engineeringtoolbox.com, "Thermal Conductivity of Some Common Materials and Gasses."
2. M. S. Mamlouk, MW Witczak, K. E. Kaloush, & N Hasan, "Determination of Thermal Properties of Asphalt Mixes," ASTM (International), Vol. 33, Issue 2, March 2005.
3. P. G. Jordan & M. E. Thomas, "Predictions of Cooling Curves for Hot-Mix Paving Materials by a Computer Program," Transport and Road Research Laboratory Report 729, 1976.
4. J. S. Corlew & P. F. Dickson, "Methods for Calculating Temperature Profiles of Hot-Mix Asphalt Concrete as related to the Construction of Asphalt Pavements," Asphalt Paving Technology 1968, Proceedings of Association of Asphalt Paving Technologists Technical Sessions, Vol. 37, pp. 101-140.
5. P. A. Tegeler & B. J. Dempsey, "A Method of Predicting Compaction Time for Hot-Mix Bituminous Concrete," Asphalt Paving Technology 1973, Proceedings of Association of Asphalt Paving Technologists Technical Sessions, Vol. 42, pp. 499-523.
6. J Kim, Y Lee & M Koo, "Thermal Properties of Granite from Korea," American Geophysical Union, Fall Meeting 2007, Abstract #T11B-0576.
7. M. Sedighi & B. N. Dardashti, "A Review of Thermal & Mechanical Analysis in Single & Bi-Layer Plates," J of Materials Physics & Mechanics, Vol. 14, PP. 37-46, 2012.

(2) Poor mixing could be another problem of those 100% RAP recycling plants because mixing only relies on blending of tumbled materials caused by the rotation of the inclined mixing drum, without any frictional shearing. Frictional shear mixing can cause the convectional heating to materials instead of the conductive heating in the conventional tumbling mixing. Poor mixing requires additional mixing tool like a pug mill in those 100% RAP recycling plants, but this mixing usually performs at an ambient temperature without heating. The poor heating and mixing that cannot be solved are big obstacles in getting decent HMA production.

(3) A conventional oil burners or oil pipes used in those 100% RAP recycling plants make 80% combustion of fuel, and thus produce more air pollutants like NOx, SOx, CO, $CO_2$, etc. compared to 100% combustion.

(4) Manufacturing and installation cost of those 100% RAP recycling plants are usually too high to be practical due to complicated equipment needed.

(5) These plants can produce only small amount of good quality 100% RAP-recycled mixes that is not practical in reality.

(6) The only innovation made from the existing HMA plants is the complete separation of material flow from heat transfer to make indirect heating necessary for 100% RAP recycling and no dust collector facilitation. Unfortunately, most of those plants are idle or scarcely used in operation due to limitations explained above.

DISCLOSURE OF THE INVENTION

In attempt to resolving limitations inherent in the existing and developing HMA plants, this invention provides the following innovations.

(1) The main producer in this invention consists of a rotating inner drum, a stationary outer housing surrounding the inner drum whose length can be longer or shorter than the inner drum, a materials transfer channel between the inner drum and the outer housing, and a burner for heating materials located inside of the inner drum to make the indirect heating system.

(2) Helically aligned segmented screw flight and directional flight both fixed on the outside surface of the rotating inner drum creates frictional shear force on materials in the channel when the inner drum rotates. These flights cause helical material transfer, frictional shear mixing and convectional material heating in the channel. This frictional shear mixing in this invention is far effective than simple tumbling mixing in the existing and the developing plants. Vacancies between two adjacent segmented screw flights, and among the segmented screw flight, the directional flight, the inner drum and the outer housing, all, contribute to material mixing during rotation of the inner drum.

(3) No dust generation due to complete separation of material heating from material transfer (called indirect heating) excludes dust collector facility that is essential unit in the existing direct heating plants.

(4) The indirect heating system is obtained by locating the surface combustion burner at inside and material flow at outside of the inner drum wall. Heat generated from the surface combustion burner at inside of the inner drum arrives at the inner wall and then the heat passes through the wall by heat conduction to arrive at the outside surface. Heat arrived there conducts further to segmented screw flights and directional flights sitting on the outside surface of the inner drum. Thus, materials contacting on the outside surface of the inner drum and those flights by rotation receives convectional mixing and heating just like the circulating air (materials) heated by contacting the protruding thermal fins in a heat exchanger. In this way, the outside surface of the rotating inner drum, the helically aligned segmented screw flight and the directional flight can make the helical material transfer, convectional shear mixing and heating all taking place at the same time. This is an innovative technical breakthrough never known in the history of HMA plants. In addition, the shear friction occurring between the material transfer tools (segmented screw and directional flights) and transferring materials creates another heating called frictional shear heating. The heating system in this invention is far effective over other existing heating methods.

(5) A surface combustion burner adopted first time in this new HMA plant accomplishes 100% fuel combustion that is achieved by using the mixed fuel (proper mixture of air and fuel) that leads to fuel saving as well as considerably reduced air pollution. Diverse geometrical heating surface including a cylindrical shape provides perpendicularly oriented heating direction to material flow permitting high energy density. The heating energy from the infrared and the blue flame mode in the surface combustion burner is very powerful in meeting all kinds of heating requirement.

(6) Capability of adding RAP aggregates at the beginning of the material inlet and applying powerful heating, strong frictional shear mixing and full material transfer in the channel make a large amount of the 100% RAP-recycled HMA production realized in reality.

The unique indirect heating system, introduction of the surface combustion burner, absence of dust collectors, use of segmented screw and directional flights to create convectional shear mixing and heating, 100% RAP recycled-HMA production and the simultaneous processing of material transfer, heating, and mixing are all innovative concepts shown first time in this invention.

Many technical details of this invention will appear from the following description and references made to the accompanying drawings forming a part of this specification wherein like reference characters designate corresponding parts in the several views.

Before explaining at least one embodiment of the invention in detail, it makes sure that the invention is not limited in its application to the details of construction and the arrangements of the components set forth in the following description or illustrated in the drawings. The invention is capable of other embodiments and of practiced and carried out in various ways. Moreover, it is to notify that the phraseology and terminology employed herein are for the purpose of description and should not regard as limiting.

As such, those skilled in the art will appreciate that the conception, upon which this disclosure is standing, may be readily in utilization as a basis for the designing of other structures, methods and systems for carrying out the several purposes of the present invention. It is important, therefore, that the claims are preferred standards including such equivalent constructions insofar as they do not depart from the spirit and scope of the present invention.

TABLE 1 depicts thermal properties of RAP, Granite Aggregate and Carbon Steel.

TABLE 2 depicts a comparison between surface combustion and conventional gas burners.

BEST MODE FOR CARRYING OUT THE INVENTION

With reference to the drawings, the preferred embodiment of the revolutionary HMA producer is herein described. It should be clear that the articles "a", "an", and "the", as used in this specification, include plural referents unless the content clearly dictates otherwise. The present invention is related to a next generation HMA plant capable of producing the regular HMA using mostly virgin aggregates as well as the recycled HMA using up to 100% RAP aggregates for construction of all kinds of new and maintenance asphalt pavements including major and local highways and airport taxiways.

A revolutionary asphalt plant utilizing the teachings of the present invention may consist of an HMA producer (called as the drum mixer) as a main facility, cold aggregate bins for storage of virgin or RAP aggregates or both, a hot asphalt binder storage tank, and a storage silo for storing HMA produced.

Figure 1:
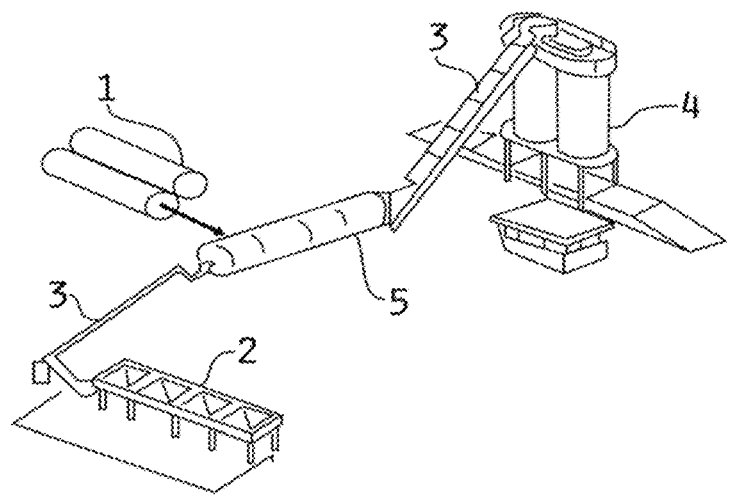
FIG. 1 is a schematic of a production plant utilizing the present invention.

FIG. 1 represents such a revolutionary central HMA plant. This new central plant seems to be identical to the present central continuous HMA plant in the view of both having asphalt storage tank (1), cold bin for virgin and RAP aggregates (2), belt conveyor (3), storage silo (4), and HMA producer (5). Note that, as described above, the prior art central continuous HMA plant requires additionally dust collectors and RAP-feeding facility. The units (1) to (4) are auxiliary to the main HMA producer (5) and have identical functions in both the prior art and present invention. However, the revolutionary HMA producer (5) in this invention demonstrates quite different mechanical structure and processing mechanism from all existing ones such that it can eliminate dust collectors and RAP-feeding facility essential in all existing HMA plants.

Figure 2:
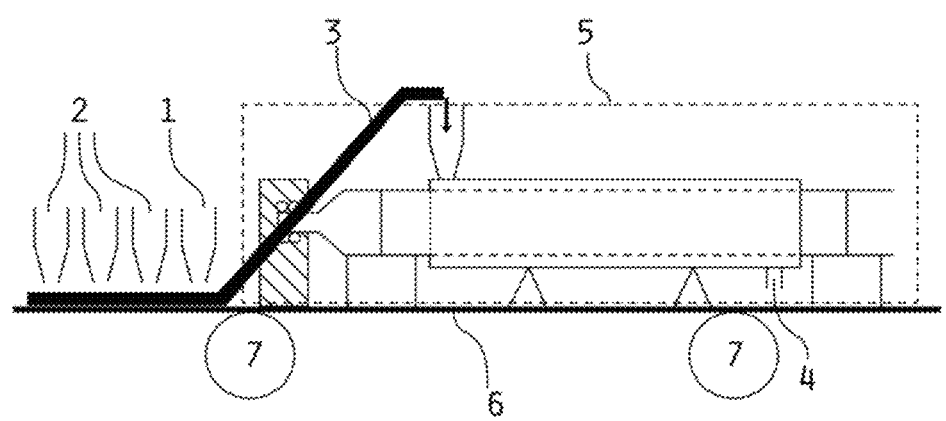
FIG. 2 is a schematic of a mobile production plant utilizing the present invention.

FIG. 2 represents a revolutionary mobile/in-place HMA production plant. This unique mobile plant is different from the existing hot in-place recycling plant (i.e., remixing and repaving plant) because the former uses the cold RAP collected by the cold milling in contrast to the latter using the hot RAP collected by hot milling that requires pavement heating in advance. Note that RAP collection by the cold milling is easier and faster than the hot milling involving slow heating. Thus, the production capacity of the formal mobile plant is a lot more than the existing hot in-place recycling plant. This new mobile HMA plant is identical to the revolutionary central HMA plant shown in FIG. 1, except additional units such as loading frame (6) and tires (7) to make the plant be mobile. That is, the revolutionary HMA producer (5) shown in FIGS. 1 & 2 is independent of the plant type, and can be utilized for either the central or the mobile form. The unique revolutionary HMA plant producer (5) in this invention, taking a key role in HMA production plant, is going to describe in more detail hereafter.

Figure 3:
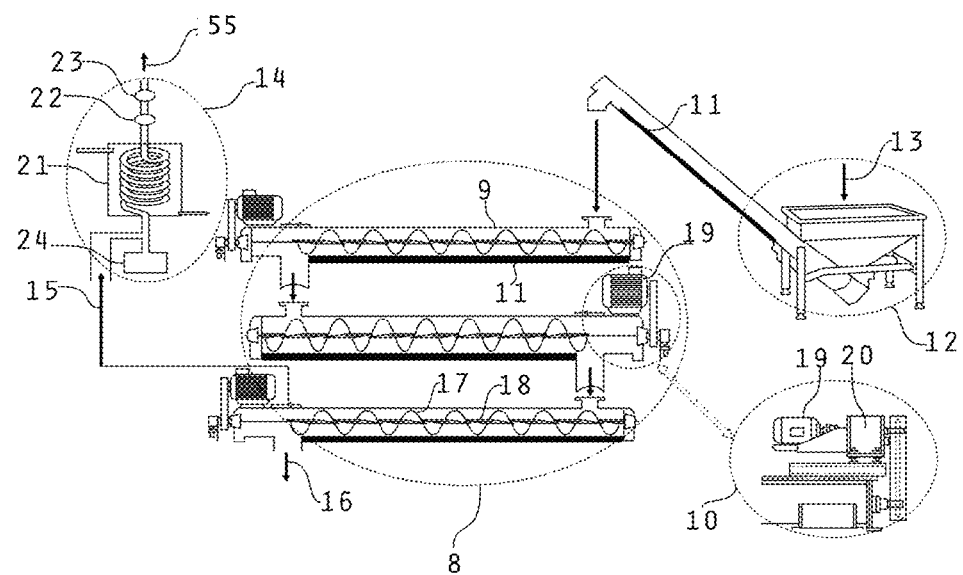
FIG. 3 is a schematic of a screw conveyor-type HMA producer.

FIG. 3 manifests one embodiment of a revolutionary HMA plant. The main unit of the plant is a screw conveyor-type producer (8) that is a unique combination of several screw conveyors (9) running by the screw driving device (10). The surface combustion burner (11) heats the outside bottom of the screw conveyors, and a feed (or a belt) conveyor (12) feeds materials (13) into the inlet of the producer. A gas purifier (14) cleans gases (15) evolved in the producer (8). The following paragraphs explain operation of each unit.

Raw materials (13) arrived at the hopper of the feeding screw (or belt) conveyor (12) that controls the amount of raw materials (13) entering into the inlet of the producer and therefore the production rate of HMA (16). Materials (13) entered into the inlet hopper proceed helically to reach the second conveyor by shearing force of the rotating full screw (17) attached on the screw shaft (18). The shaft rotates by the screw driving device (10) composed of a motor (19) and a reducer (20). Materials (13) passed through the second conveyor enter into the third conveyor and finally reach the outlet to produce a well-mixed hot HMA product (16).

During passing through the several screw conveyors (9), materials (13) experience frictional shear mixing by rotation of the full screw (17) and the screw shaft (18). They receive frictional shear heating as well as indirect heating coming from a surface combustion burner (11) located at the outside bottom half of a screw conveyor (9) and a feed conveyor (12) whose bottom halt is also heated by the surface combustion burner. Enough heating and mixing ensures asphalt binders and organic additives among entering materials (13) to be melted and coated on aggregate surfaces and produces uniformly mixed hot HMA products (16) at the exit of the final screw conveyor (9) in the producer (8). The HMA products (16) can be either stored at the storage silo (4) or loaded into trucks to transport them to construction sites.

The number of screw conveyors (9) required in constituting the screw conveyor-type producer (8) depends on whether provision of enough heating on materials is possible or not from the surface combustion burner (11) and the frictional shear heating to reach the desired material temperature at the exit of the final screw conveyor (9).

Numerous other modification, combination, and arrangement of screw conveyors (9) in the screw conveyor-type producer (8) can be possible. For instance, screw conveyors (9) of the producer (8) in FIG. 3 can have the inclined arrangement in the same direction, tilted ones in the alternative direction, different numbers used, diverse screw sizes, or conveyor length adopted. All those modified producers are still within the scope of this invention.

The screw conveyor-type HMA producer in FIG. 3 achieves the technical objectives set in this invention. The first is an indirect heating system separating material flow from heat transfer passage. The second is that RAP enters into the inlet of the producer with other material constituents (filler, chemical additive, virgin aggregate, adhesive agent, etc.) and does not require an extra RAP feeding facility. The third is the elimination of dust collectors due to no dust generated. The fourth is the use of surface combustion burner giving high heating power on the cylindrical surface with perpendicular heating. The fifth is the capability of 100% RAP recycling. The sixth is the single simultaneous process of material transfer, heating, and mixing. The seventh is the considerable reduction in environmentally polluting gasses. The eighth is the fuel saving by combusting 100% fuel in the surface combustion burner. The ninth is the screw and its shaft creating effective shear mixing and heating on materials, not tumbling mixing. Any existing HMA producer has never shown such characteristics explained above. Uniqueness of this producer lies in using the screw flight to make frictional shearing of materials for material transfer and mixing, not like the oil burner and the pocket flight used in conventional drum mixer, and first time introduction of a surface combustion burner fitting to any geometrical shape, reducing air pollutant gasses, generating powerful heating, and saving fuel due to 100% clean combustion.

A typical single screw conveyor (9) commonly finds its use in conveying materials from a given inlet to the designated outlet usually under no heating condition. Note that combination of these screw conveyors (9) makes application first time to the screw conveyor-type HMA producer (8) by providing a heating system made of the surface combustion burner (11).

Figure 4:
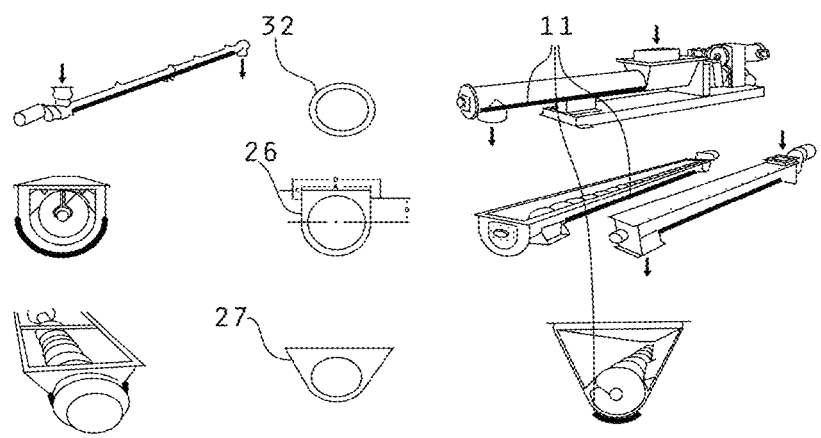
FIG. 4 is various views of three kinds of screw conveyor outer housings.

The screw conveyor (9) has a conveyor housing surrounding a screw (17) and its shaft (18). FIG. 4 manifests three types of screw conveyor housings often used. A screw conveyor used in constructing the screw conveyor-type HMA producer (8) also can choose one of these housings. For a given material, the frictional shearing force of a given screw required in transferring materials against the stationary conveyor housing increases in the order of the V-shaped (27), the U-shaped (26) and the tubular trough (25). Likewise, the required power of the driving device follows the same order. V-shaped (27) or U-shaped trough (26) is better choice for materials hard to transfer due to the less frictional contact area of materials leading to decreased friction.

The driving device (10) rotating the screw shaft with the screw in FIG. 3 usually consists of a motor (19) alone, and sometimes combination of the motor (19) and the reducer (20) to overcome the strong rotational resistance of materials.

The amount of raw materials entering into the screw conveyor-type producer (8) determines the HMA production at the exit. The feeding screw conveyor (12) in FIG. 3 is the solution in determining the feeding material amount. Sometimes, a large material feeding requires a belt conveyor instead of the feeding screw conveyor (12). However, for accurate control of feeding rate and material preheating, the feeding screw conveyor is favorable.

Cleaning pollutant gases (15) evolving during mixing and heating within the screw conveyor-type producer (8) needs gas purifier (14) in FIG. 3. The gasses evolved will be mostly volatile organic fumes having the low molecular weight and steams evaporated from water initially contained in materials (13). The heat exchanger (21) in the purifier (14) makes these gasses (15) mostly be liquefied and collected in the liquid container (24). The DOC (Diesel Oxidation Catalyst) device (22) in the purifier (14) eliminates relatively small amount of $CO_x$, $NO_x$ and $SO_x$ evolved from the surface combustion burner (11), compared to the large amount in the general oil burner. Note that the surface combustion burner

(11) receiving the adjusted ratio of air-to-fuel to accomplish 100% combustion requires less fuel and less pollutants evolved accordingly, compared to the unadjusted fuel combustion of the general oil burner. The blower (23) helps all gasses (15) produced in the producer (8) pass through the gas purifier (14) before discharging into the atmosphere.

Figure 5:
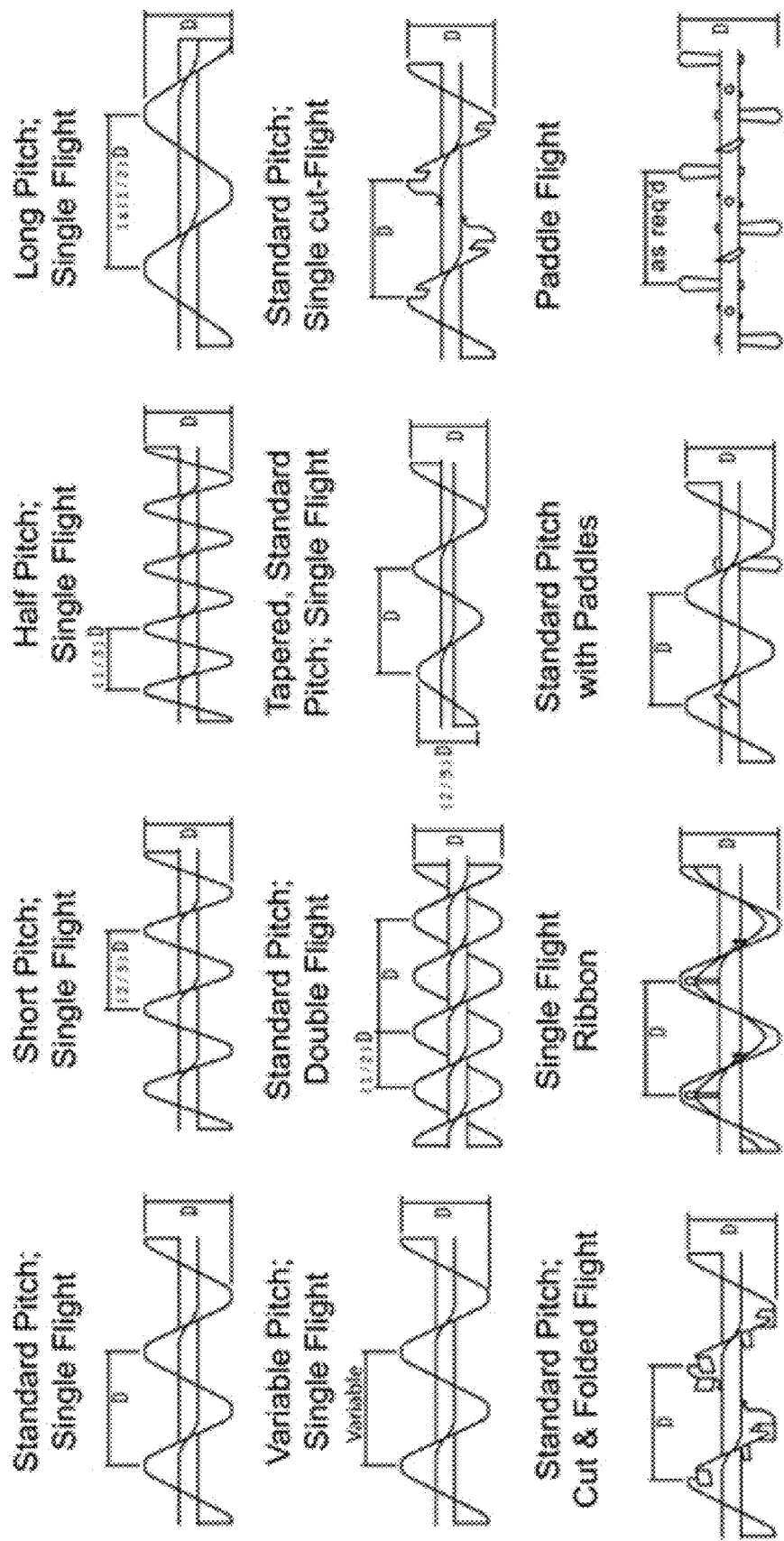
FIG. 5 is a collection of side elevation views depicting various kinds of shafted screws.

Screws (17) in the screw conveyor (9) have two different kinds; shafted and shaft-less ones. Either one can be used in the screw conveyor (9). The shafted screw has many different kinds according to different designs of pitches and flights as shown in FIG. 5. One of those shafted screws (17) applies to make good material transfer.

In this invention, a major material-heating source is a surface combustion burner (11) used, first time, in the HMA plant history. FIGS. 3 and 4 demonstrate its application. Burners (like the general oil, the microwave, the heated oil, and the infrared) have been used to heat materials (i.e., virgin aggregate, RAP, HMA, and asphalt pavement) for HMA production in the existing plant, or pavement repair of damaged pavements. These burners can be used as the burner in this invention, too. However, the surface combustion burner (or the metal fiber burner) (11) finds its use first time in this invention.

A screw conveyor-type HMA producer (8) requires a good heating source with a high energy density to heat cold RAP or virgin aggregates located inside of the screw conveyor. Success of the screw conveyor-type HMA producer (8) largely relies on enough material heating in the mixing process. RAP that is not a good heat-conductive material compared to aggregates (about 3.3 times harder) should be heated, melted, and mixed well before discharging into the outlet. Thus, the heating process is the critical step in the screw conveyor-type producer (8), because material contact area for heating is limited to be less than the bottom half of the conveyor housing. Screw (17) and its shaft (18) that are away from the heating surface do not contribute to material heating directly. The possible heating surface of the screw conveyor is the less than the bottom half of the cylindrically shaped portion of the outer housing between the inlet and the outlet. The above two factors are the critical limitation in the screw conveyor-type producer (8).

To resolve two limitations, the surface combustion (or metal fiber) burner (11) may be best suited as a burner. It is the new generation heating method to make the perpendicular flame from the burner surface to the heating object. The surface combustion burner has several advantages compared to other burners; that is, homogeneous and uniform heating with high modulation rate, high efficiency with low emission rate, less pressure drop, flashback safety, thermal expansion control, resistance to thermal shocks, robustness, and quick response of high temperature arrival and cooling down.

The heating power of the surface combustion (or metal fiber) burner is impressive. Depending on the firing intensity, the combustion surface burner (11) can occur in two different modes. One is the radiant mode whose infrared heating ranges from 100 to 500 $kW/m^2$. The flame color is red or orange. The other is the blue flame mode. It is the convection heating ranging from 500 to 10,000 $kW/m^2$. The blue flames hover above the surface and release the majority of the energy through convection. Flame color is blue.

Surface combustion (or metal fiber) burner geometry has diverse shapes to fit into various heating surfaces. Here, the heating geometry is the less than the bottom half of the cylindrically shaped screw conveyor housing. In other words, the surface combustion burner (11) can satisfy both requirements of high energy density and curved heating surface. This is why the screw conveyor-type producer (8) chooses the surface combustion burner (11) as a favorable heating system, first time, in this invention, even though other heating methods can be used. The fuel for the surface combustion burner can be either LNG (Liquid Natural Gas), LPG (Liquid Propane Gas), or possibly WO (Waste Oil), all, mixed with air. LNG is the common energy source because it is more economical over LPG. The surface combustion (or metal fiber) burner (11) has several other excellent heating performances. TABLE 2 compares the surface combustion burner to the existing general oil burner. The former burner exhibits many advantages over the latter.

TABLE 2

| Items | Surface Combustion (or Metal Fiber) Burner | Conventional Oil Burner |
| --- | --- | --- |
| Flame Shapes | A uniform blanket of short flame (1-3"); Less heating space and broad applied region. | Long narrow flame (1-2') from nozzle tip; Requiring more heating space and less applied region |
| Characteristics | 1. Homogeneous fast heat-up & cool-down: Heating time is 5 s that is reduced over 70%.<br>2. Delicate temperature control: Stability kept in 700-1,600° C.<br>3. Minimized combustion chamber: 70% heating space reduction.<br>4. Very low $NO_x$ & $CO_x$ emission<br>5. Fuel Saving: 15-30%.<br>6. Blue flame reaches to 3 $MW/m^2$ in capacity up to 44 MW | A single flame contains 3 portions;<br>1. Over-heating portion generates more $NO_x$<br>2. Normal combustion portion<br>3. Incomplete combustion portion generates less fuel efficiency and more $CO_x$ pollution<br>Usually parallel heating, not perpendicular. |

So far, one class of the revolutionary HMA producer, the screw conveyor-type producer (8), has shown its characteristics for production of up to 100% RAP-recycled HMA. Note that this new producer based on combination of the conventional screw conveyors (9) and the novice heating system, the surface combustion burner (11), will work fine as long as the produced HMA obtains the desired temperature. The main drawback of this producer (8) is that the material transfer tools (screw and its shaft) constantly contacting on materials from the inlet to the exit do not contribute to material heating directly. This problem necessitates combination of many screw conveyors (8) to achieve the desired material temperature at the exit. In other words, the insufficient heating system in the single screw conveyor-type producer (8) requires many screw conveyors (9). Involvement of many conveyors makes the production equipment be complicated and costly when one considers small and medium amount of HMA produced by this producer (9).

Modification of the screw conveyor-type producer (8) is necessary in overcoming its drawbacks. The modification is achieved by enlarging the shaft (18) of the screw conveyor (9) to a big drum size having screw flights on its surface, and by facilitating a heating source (i.e., surface combustion burners) at inside of the drum and, if necessary, at outside of the outer housing, too.

Figure 6:
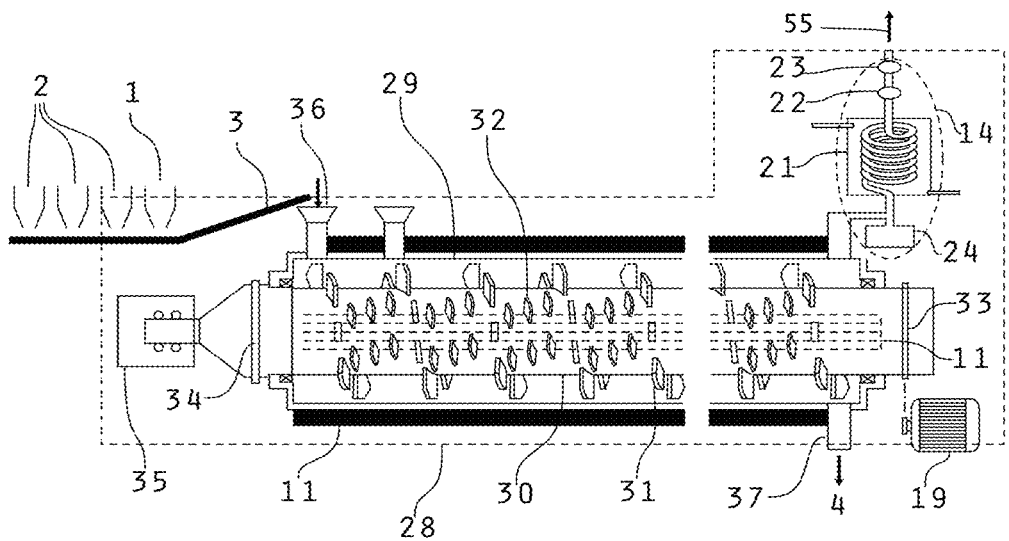
FIG. 6 is a schematic of an HMA plant representing the present invention.

FIG. 6 describes the next-generation HMA plant and its major units schematically. The plant consists of the asphalt storage tank (1), the cold bins (2), the belt conveyor (3), the HMA silo (4) and the next generation producer (28). Among these, the producer (28) is a unique and innovative unit representing this invention.

The innovative producer (28) shows technical breakthroughs and possesses innovative mechanical structures that have never known before in the asphalt plant history. Its characteristic structure consists of stationary outer housing (29), rotating inner drum (30), segmented (or full) screw flight (31), directional flight (32), surface combustion burner (11), chain and sprocket (33), inner drum driving device (19), idler (or tire/trunnion) (34), gas purifier (14), axial thrust bearing assembly (35), cone connector, small diameter pipe, material inlet (36) and outlet (37).

The next generation producer fixed at a certain location can constitute the central plant as shown in FIG. 1, and the producer and the auxiliary facilities loaded on the frame (6) with tires (7) can be a mobile plant as shown in FIG. 2. Note that the mobile plant using the cold-milled RAP as a processing material differently from the mobile/hot in-place plant using the hot-milled RAP can find its appearance first time in this invention. This feature makes the mobile producer best suited for RAP recycling in the construction site where cold RAP is generated.

Note that the next generation producer (28) in FIG. 6 originates from the screw conveyor-type producer (8) in FIG. 3. The relatively big-size inner drum (30) in the former (28) accompanying with the large outer housing corresponds to the smaller screw conveyor (9) in the latter (8). The surface combustion burner (11) heats only the outside of the screw conveyor (9) in the latter (8), while it heats both the inside of the inner drum (30) and, if necessary, the outside of the outer housing (29) in the former (28). In addition to the segmented (or full) screw flight (31), another flight called the directional flight (34) applies to the former (28) to improve mixing, heating, and material transfer. The screw rotation device (19) directly connects to the screw shaft (18) on the one end and the thrust bearing assembly on the other end of the shaft in the latter (8), while the inner-drum rotation device (19) in the former (28) connects to the chain and the sprocket (33) circumferentially attached to the outside surface of the inner drum (32) just like the conventional drum mixer and serves to rotate the large inner drum (30). To make balance of the inner drum, the idler (or tire/trunnion) (34) is facilitated at both ends of the inner drum (30). Rotation of the inner drum to make helical material transfer can bring two mechanical issues; one is the backward retraction movement of the inner drum (30) (as much as the material forwarding movement) that requires the thrust bearing assembly (35) at the other end to prevent the retraction. The other is lift-up of the inner drum due to accumulation of materials underneath. Pushing the inner drum down to keep in place requires to counter the lift-up, the thrust roller (100) is required on the top of the idler (34), that is explained later. Effect of the better mixing, efficient heating and more material transfer in the new producer (28) permit a single processor sufficient enough to produce good HMA product, compared to the screw conveyor-type producer (8) necessitating combination of several screw conveyors (9). Note that the outer housing (29) in FIG. 6 is shorter than the inner drum. It could be longer than the inner drum to cover every unit in the producer covered by the outer housing to make safe from wetting by raining and snowing. All subsequent figures show the shorter the outer housing than the inner drum, but it could be easily changed.

Now, processing mechanisms of the next generation plant (28) shown in FIG. 6 are explained in detail. Raw materials (virgin aggregates, RAP, other recycled asphalt, organic additives, etc.) in the cold bins (2) drop down on the moving belt conveyor (3) together with spray of hot asphalt binders from the asphalt storage tank (1) on the top of those incoming cold materials according to the HMA product composition. These compositional materials on the moving belt conveyor (3) transfers and enters into the inlet (36) of the stationary outer housing (29). At the inside chamber of the stationary outer housing (29), the inner drum (30) constantly rotates by the chain and the sprocket (33) run by the driving device (19). To make horizontal balance of the inner drum (32), the idler (or tire/trunnion) (34) runs on the both ends of the drum with the sprocket (35) locating within.

Entered materials into the inlet (36) make helical movement in the channel between the stationary outer housing (29) and the rotating inner drum (30) by frictional shearing force of the helically aligned segmented (or full) screw flight (31) and the directional flight (32) attached on the drum's outside surface. Note that the frictional shearing enhances better material mixing compared to the simple mixing by tumbling in the conventional drum mixer.

To the extent of material forwarding force, the inner drum (32) itself receives the retraction force. The thrust bearing housing (35) is necessary to prevent such backward retraction force of the inner drum (30).

During the helical transfer, materials receive indirect heating initiated by a stationary surface combustion burner (11) located at the inside of the inner drum (30) and, if necessary, at the outside of the outer housing (29). Materials also experience heating from rotational contact by the hot-segmented (or full) screw flights (33) and the directional flights (34) conductively heated from the surface combustion burner. Since these flights are metals that are an excellent conductive material, they receive heat about 32 times faster than poorly conductive materials in moving, and play a role of an efficient heating tool protruding on the rotating inner drum's outside surface. The rotation of these flights through materials creates continuous convective material heating and shear mixing upon contact. All these heating and mixing contribute to melting, mixing, and uniform coating of the organic materials (virgin and RAP asphalt binders, and organic additives) on aggregates.

Note that the melted organic materials also play a role of a lubricant for solid particles (virgin and RAP aggregates and fillers) to move helically forward with less frictional resistance. Finally, the processed mixture arriving at the exit becomes a well-mixed, uniform HMA product (4) holding a desired high temperature. Note that material transfer, mixing, heating, melting, and coating, all, take place together by a single process in the next generation producer (28), differently from the conventional HMA batch or drum processing where heating and mixing are separate processes.

If any organic fumes, steams, and pollutant gasses (15) evolve in the processing region, drastic reduction or elimination of them occurs by going through the gas purifier (14) before discharging into the outside air. The pollutant-reduction process in the screw conveyor-type producer (8) can apply to the next generation producer as well. Because the completely indirect heating system does not generate significant dusts and fines, the next generation HMA plant (28) may exclude the dust collector unit that is essential in the conventional asphalt plants.

The next generation producer (28) also adopts the same surface combustion burner (11) as in the screw conveyor-type producer (8) because of high energy density, capability of cylindrical surface heating, and many other benefits indicated in TABLE 1, compared to the conventional oil burner.

The key benefit of the next generation producer (28) lies in ability of regenerating the 100% RAP into the valuable HMA. The features of shear frictional material-transfer from the inlet (36) to the outlet (37), good frictional shear mixing, and completely indirect convective heating system can process 100% virgin HMA and up to 100% RAP in the next generation producer (28). In the contrary, the conventional HMA producer shows the RAP regeneration limit to be less than 50 percent of the total materials. Any materials including the RAP aggregates can enter into the inlet in the next generation producer (28), but the conventional producer (a drum mixer) only permits the RAP entry at the mixing zone.

The 100% RAP regeneration provides benefits of eliminating land pollution due to no RAP left over after production, significantly reducing the raw material cost for HMA production, and saving the expensive virgin materials (asphalt binder and aggregate), etc.

The 100% RAP regeneration, the use of the segmented screw flight (31) and the directional flight (32), and the indirect heating by the surface combustion burner in the next generation producer (28) make unique characteristics over the conventional and any developing producers.

Each unit in the next generation producer (28) has different features. The following statements explain those features. The outer housing (29) in the next generation producer (28) has three different shapes; that is, the tubular (25), the U-shaped (26) and the V-shaped trough (27) that are same as those in the screw conveyor-type producer (8) depicted in FIG. 4. Only difference is the size. The latter producer (8) has relatively small housing compared to the large housing of the former (30). As explained earlier, difficulty in material flow determines the shape of the outer housing among the three troughs shown in FIG. 4.

The characteristics of the rotating inner drum (30) depend on kinds of the screw flight (31) and the directional flight (32) attached on the outside surface of the drum. As far as screw flight is concerned, this invention adopts either the full or the segmented screw flight (31). The full screw flights (17) shown in FIG. 5 for the screw conveyor-type producer (8) apply to the next generation producer as well, if they are present on the outside surface of the inner drum (30) instead of the screw shaft (18). Another screw types in addition to full screw flights (17) are the segmented screw flights (31). Many different screw segments with vacancy between two consecutive ones helically constitute the segmented screw flight on the outside of the inner drum surface. All kinds of full screws in FIG. 5 can cut into segment shape to form segmented screw flight (31). They generally give better mixing, less driving force and easy to be fabricated, but less production compared to the full screw flights. FIG. 6 schematically displays one of segmented screw flights (31).

Figure 7:
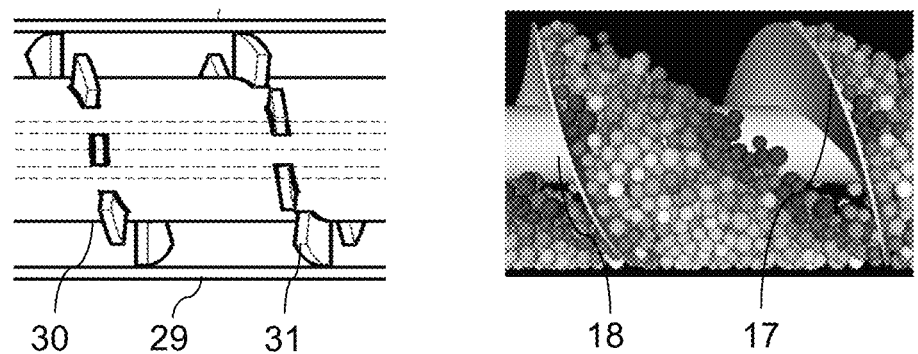
FIG. 7 is a side elevation and photograph depicting material transfer by frictional shearing of a rotating shaft and a screw flight.

Material transfer caused by frictional shearing of the segmented (or the full) screw flight (31) and the outside surface of the rotating inner drum cannot reach the full carrying capacity of material flow due to gradually diminishing shear force away from the shearing surfaces of the screw and the rotating inner drum. FIG. 7 demonstrates the evidence of partial material carrying.

Use of directional flight is the solution in improving material transfer capacity. FIG. 6 displays the directional flights (32) located on the perpendicular line of a screw pitch between two adjacent screw crests that are expanded over the entire helical distance with a given interval to move more materials forward to the exit. Note that the directional flight (32) creates more shearing surface allowing better material transferring, promotes good shear mixing, generates higher frictional heating, and plays a role of an efficient material heating tool.

Figure 8A:
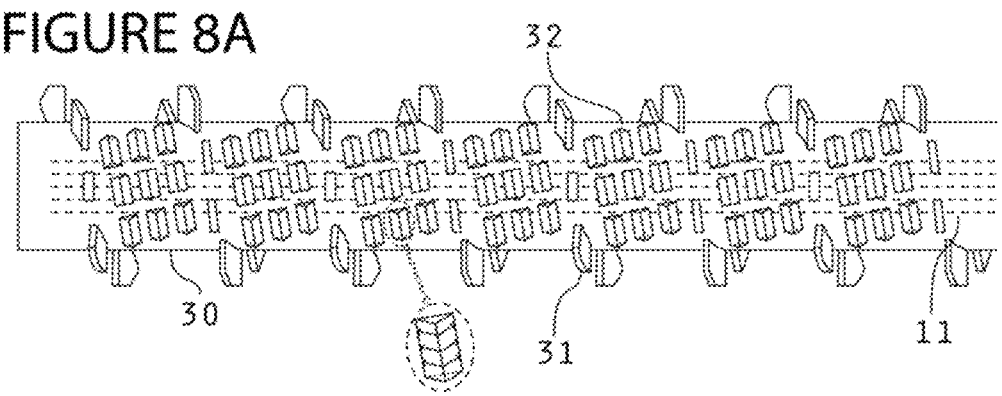
FIG. 8A is a side elevation view of an inner drum with an alternate directional flight.
Figure 8B:
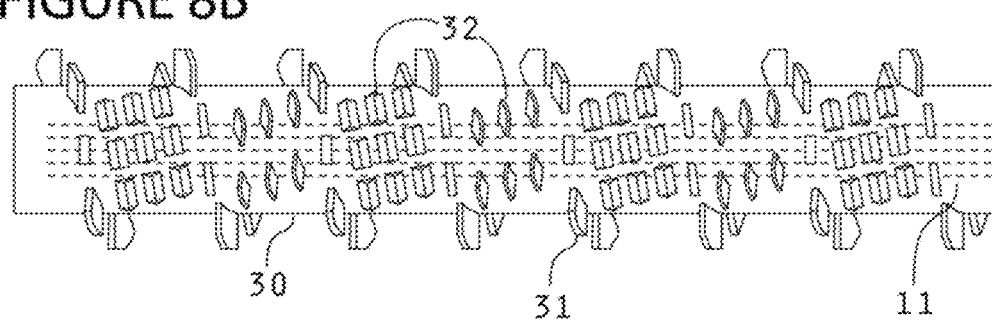
FIG. 8B is a side elevation view of an inner drum with two different directional flights.

Directional flights (32) attached on the outside surface of the inner drum (30) can have many different shape and arrangement as long as they can promote efficient material transfer, mixing and heating during rotation of the inner drum (30). FIG. 8 demonstrates an example of another shape of the directional flight (FIG. 8A) from the one given in FIG. 6 and arrangement of two different directional flights (FIG. 8B) in a single drum.

Figure 9:
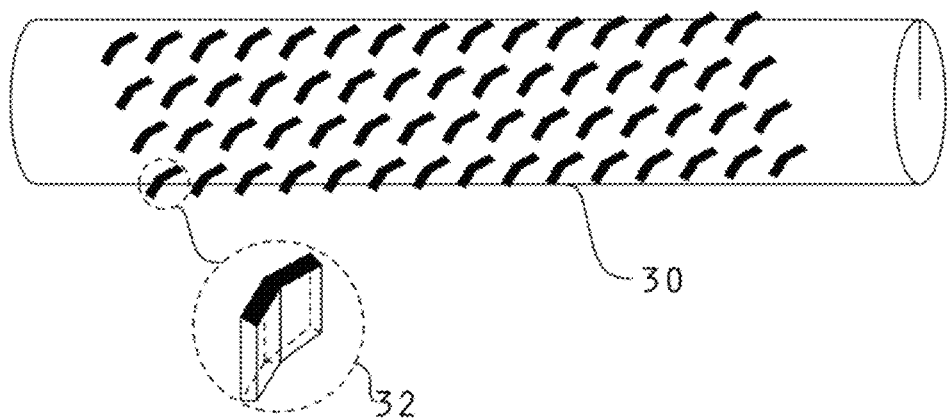
FIG. 9 is a side elevation view of an inner drum having an exemplary directional flight with no screw flight.

So far, this invention claims a segmented (or full) screw flight (31) together with a directional flight (32) to be an essential unit in the rotating inner drum (30). However, utilization of the directional flight (32) alone without the screw flight (31) can be possible as indicated in FIG. 9. Note that such a flight is aligned helically on the outside surface of the inner drum to transfer materials in the helical direction. All kinds of directional flights (32) standing alone on the outside surface of the inner drum without screw flights also belong to this invention.

Figure 10:
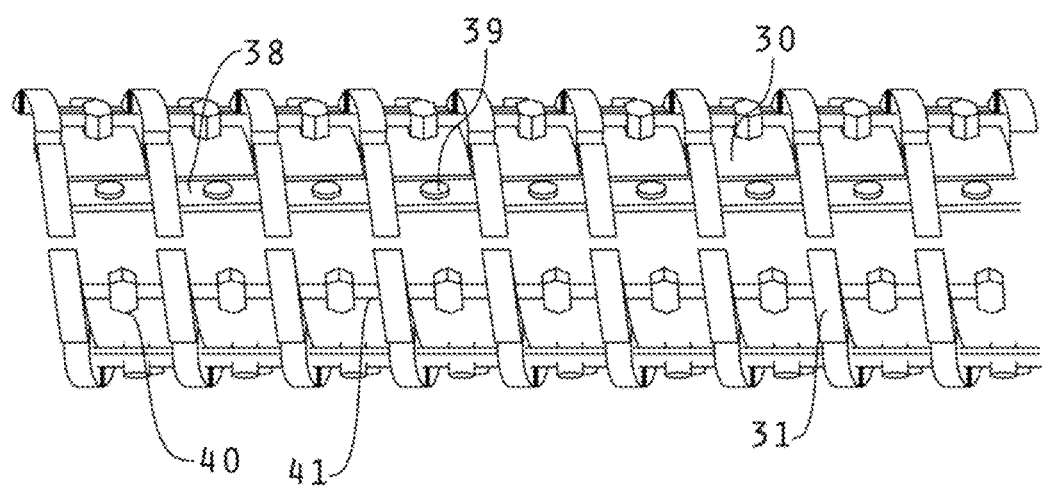
FIG. 10 is a side elevation view of an inner drum having a segmented screw flight and plate-type directional flight.

FIG. 10 demonstrates the directional flight that composes of the horizontal plate (38) with the vertical cylindrical rod (39), and the vertical plate (40) with horizontal rod (41) to have better material mixing and heating. If materials flow the above and the below of the horizontal plate at one position, they do the left and the right of the vertical plate at the next position. This alternative flow derivation creates better mixing as well as effective heating by providing more shearing surface.

Figure 11:
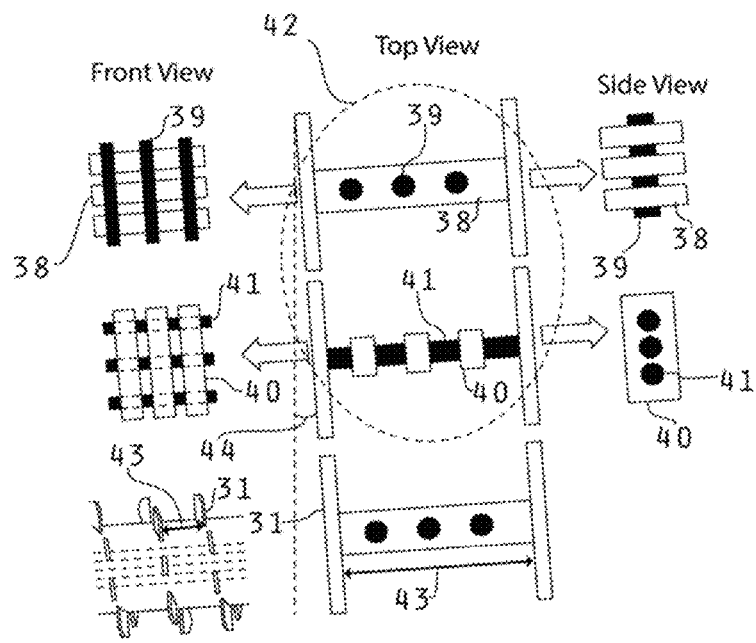
FIG. 11 is a schematic of several views of an inner drum having segmented screw flights and several plate-type directional flights in a single pitch.

For large production capacity, the pitch distance between two adjacent screw flights, and the flight height between the inner drum and the outer housing should be large enough to transfer more materials per a unit rotation. In this case, mere increase of the pitch distance and the flight height for the given segmented screw flight and the directional flights are not sufficient enough for good mixing and heating. The directional flight (32) possessing structural security as well as more shearing surface is always desirable. FIG. 11 demonstrates such an example. Here, a single pitch (43) on the cylindrical inner drum (30) unfolds to make the flat surface for better understanding. When the pitch (43) is unfolded, the segmented screw flight (31) has an inclined angle (44) against the vertical line, and the directional flight (32) shows a repeating unit (42) that contains three horizontal plates (38) with a vertical rod (39) in the screw flight height, and three vertical plates (40) with a horizontal rod (41) in the screw pitch instead of using a big single horizontal plate with a vertical rod (39), and a big single vertical plate (40) with a horizontal rod (41). In FIG. 11, the vertical rod (39) and both sides of screw segments across the pitch structurally secure three horizontal plates (38). Likewise, the horizontal rod (41) and the surface of the inner drum (30) secure three vertical plates (40). Note that difference between small and large production is the number of directional plates involved, both, in the direction of the pitch distance and the flight height. The material flow on the top and below each horizontal plate (38), and the material flow to the left and to the right of each vertical plate (40) can provide more material shearing surface leading to more material transfer, better material mixing and effective heating. The repeating unit (42) performs its function repeatedly from the starting pitch (43) to the final one. Facilitating more plates in the direction of the screw height and the screw pitch can increase more material production.

Figure 12:
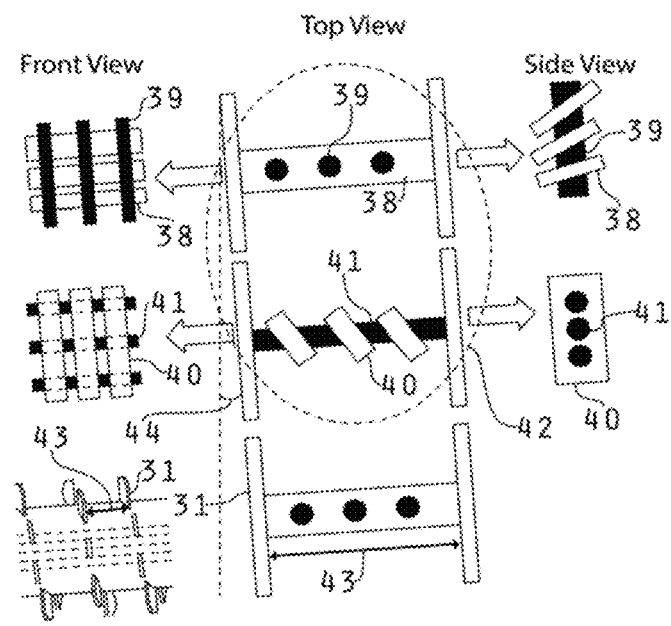
FIG. 12 is a schematic of several views of an inner drum having segmented screw flights and inclined several plate-type directional flights in a single pitch.

To increase material transfer, heating and mixing to the fullest extent possible, the directional flight of the horizontal (38) and the vertical plate (40) in FIG. 11 can change into inclined forms shown in FIG. 12 because inclination creates higher shearing surface and larger material transfer compared to the normal un-inclined plate. Thus, this invention includes all kinds of odd shaped directional flights with different numbers in the direction of the flight height and the pitch distance in the form of normal or inclined ones as long as they increase heating, mixing and production capacity.

So far, this invention has claimed the next generation HMA producer (28) having unique mechanical units as shown in FIG. 6 for production of the diverse HMA products including the 100% RAP recycled one. Afterwards, each unit of the next generation HMA producer (28) begins to claim its innovative functional characters. The outside housing (29) has claimed three different types according to difficulty in material transfer. The next unit considered was the inner drum (30). All kinds of the segmented (or full) screw flight (31) and the directional flight (32) standing on the outside surface of the rotating inner drum (30) have claimed their characteristics in the view of material transfer, indirect heating and frictional shear mixing.

Figure 13:
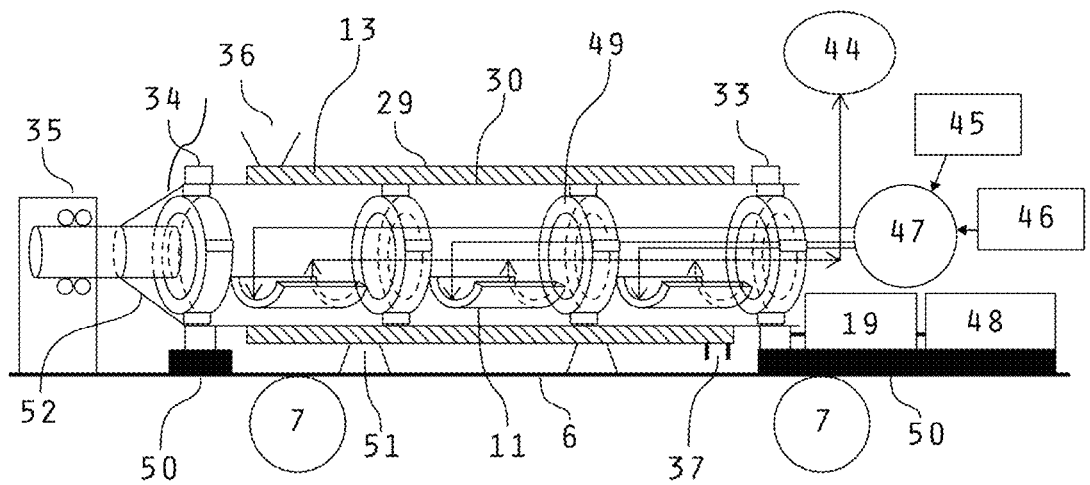
FIG. 13 is a schematic depicting the inside structure of an inner drum and other units relating thereto.

Now, the inside structure and other units relating to the inner drum (30) including the surface combustion burner (11) at the inside, the drum driving device (19), the electric generator (48), the chain and the sprocket (33), the idler (or the tire/trunnion) (34), and the thrust bearing housing (35) claim their uniqueness in the following. FIG. 13 indicates those units pertaining to the inner drum (30).

The length of the inner drum (30) is relatively long, with a plurality of outside supporters (50) almost at the end of both sides (one for the sprocket (33) and the others for idlers (34)) support the inner drum weight. Small bending is possible at the middle of the drum if there is no supporter in the middle. Such bending can cause striking of the stationary outer housing (29) by the screw flight (31) and the directional flight (32) sitting on the rotating inner drum (30) during material processing. This can bring structural damage at the contacting point of those flights against the outer housing (29). To prevent such damage due to bending, the inner drum (30) would require installation of an inside supporter (49) as shown in FIG. 13. The shape of the inside supporter (49) can be either one of circular, rectangular, pentagonal, hexagonal, heptagonal and octagonal ones placed in the given lengthwise interval, or simply using several rectangular bars (or strips) attaching along the inside wall of the entire inner drum (30) with some interval in the entire circular direction. Use of the inner drum (30) having a thick wall without any inside supporter (49) can be another alternative.

Surface combustion burner (11) is important in transferring heat energy to processing materials. As already indicated, the burner initially heats the inside wall of inner drum (30) by radiation, and then the heat passes through the drum wall to arrive at the outside wall by heat conduction where the segmented screw flight (31) and the directional flight (32) stand. Further heat conduction through these units allows effective heat transfer to materials contacting on those units during rotation. This is a completely indirect convective heating system. The indirect heating generates no dusts and no slow-down of material production, even if materials are under the high temperature, differently from the existing producers. These characteristics make RAP entry possible at the material inlet and make 100% RAP recycled HMA production feasible.

Note that those flights standing on the inner drum (30) continuously contact on materials to shear and heat materials during rotation and contribute to create the most efficient mixing and heating system. This innovative concept of material mixing and heating has never appeared in the existing or developing HMA plants worldwide. Since materials usually transfer through the less than or equal to the lower half-cylindrical region between the inner drum (30) and the outer housing (29), the burner geometry should conform to the half-cylindrical shape.

A burner that can fit into the half-cylindrical geometry is obtained from the surface combustion burner (11). Several of such burners with the given size place at the inside of the inner drum (30) as shown in FIG. 13, and then each burner's temperature set differently to achieve the desired material temperature at the exit. A single burner covering the whole drum length is also valid, but use of several burners with a certain length provides more flexibility in controlling material temperature.

The stationary surface combustion burner (11) hangs down from the fuel pipe toward the inside wall of the drum, while the inner drum (30) rotates around the burner (11). This makes sure that the surface combustion burner (11) can perpendicularly heat the rotating inner drum wall. The perpendicular heating to the material flow direction is the better way of heating over the parallel heating. As shown in FIG. 13, the air-and-fuel mixer (47) mixes air from air blower (45) and fuel from the LNG (liquid natural gas) or LPG (liquid propane gas) tank (46) to supply a proper composition of a mixed fuel to the burner (11) to make sure 100% fuel combustion. The surface combustion-burner (11) receives the mixed fuel through the fuel pipe and break out the high temperature flame by achieving 100% fuel combustion. The exhausted hot air (44) transfers to other units requiring heat.

Figure 14:
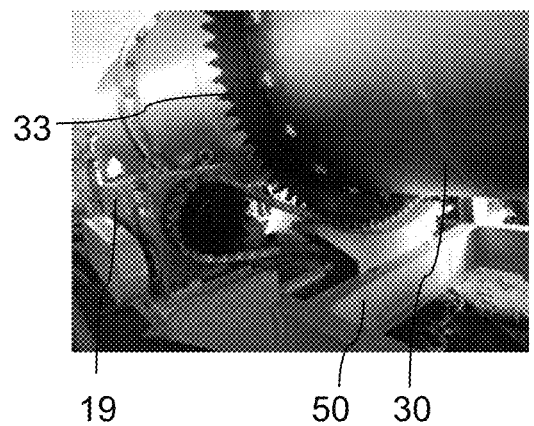
FIG. 14A is a perspective view of a motor, a chain and a sprocket to rotate an inner drum.
FIG. 14B is a perspective view of an idler assembly for use with an inner drum.
Figure 14:
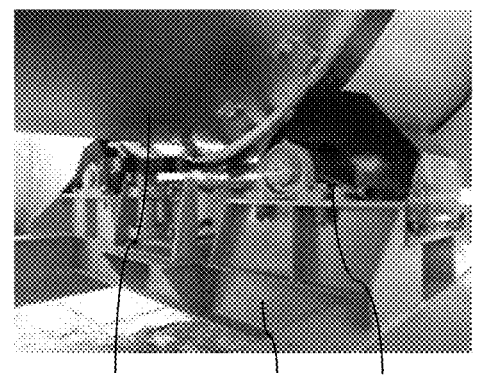

Now, rotation of the inner drum is described. Usually the motor and the reducer (19) connect each other as a single unit to drive a shaft. The rotating shaft runs the chain to rotate the sprocket attached around the inner drum circumference. Thus, rotation of the sprocket means rotation of the inner drum. The motor speed controlled by the inverter determines the drum rotational speed. The typical drum speed ranges about 4 to 16 rounds per minutes. Determination of the rotational speed depends on production capacity and product quality. The driving device of the next-generation HMA (WMA) producer is not different from the existing HMA (WMA) drum mixers. The sprocket with the chain (33) is usually located between two idlers (tire/trunnion) (34) that are positioned at both ends of the inner drum (30) to make balanced rotation. In FIG. 13, the idler (34) is shown only at one end of the drum for simplicity. FIG. 14 exhibits the picture of sprocket with the chain (33, FIG. 14A) and the one of the idler assembly (34, FIG. 14B).

The supporter of the sprocket (33) and those of the idlers (34) are at least two supporting spots to bear the entire inner drum weight as mentioned earlier. Two or three outer housing supporters (51) under the outer housing can support the entire weight of the stationary outer housing (29). Driving of the motor (19) and belt conveyors (3), and ignition of the surface combustion burner (11) require electricity. The electric generator (48) is an essential unit to generate and supply electricity needed.

The sectional screw flight (31) and the directional flight (32) attached on the outside surface of the inner drum (30) pushes material helically forward by the frictional shearing, but the inner drum (30) itself attaching those flights experiences the retraction force as much as the forwarding force of materials. This retraction force only exists in the next generation HMA plant differently from the conventional HMA drum dryer or the drum mixer. To nullify the backward motion of the drum, the axial thrust bearing (35) must be installed at the end of the material inlet side of the inner drum (30). However, it is hard to find the large thrust bearing size that can fit to the inner drum diameter. For this reason, the inner drum reduces to the smaller pipe or the tubing that can comfortably accommodates the thrust bearing assembly (35) around it. The pipe may be made of steel or other suitably strong material. The cone connector (52) finds its use by connecting the large inner drum to the large cone side and the small pipe to the smaller side. Alternatively, without using the cone connector, the thick circular plate having the smaller pipe or the tubing axially attached in the center and the gusset connecting the pipe or the tubing to the rim of the plate (or the inner drum wall) can be used. It is interesting to know that the next generation producer (28) uses combination of the thrust bearing housing (35) from the screw conveyor technology, and the sprocket/chain (33) and the idler (or the tire/trunnion) (34) from the drum mix technology.

Figure 15:
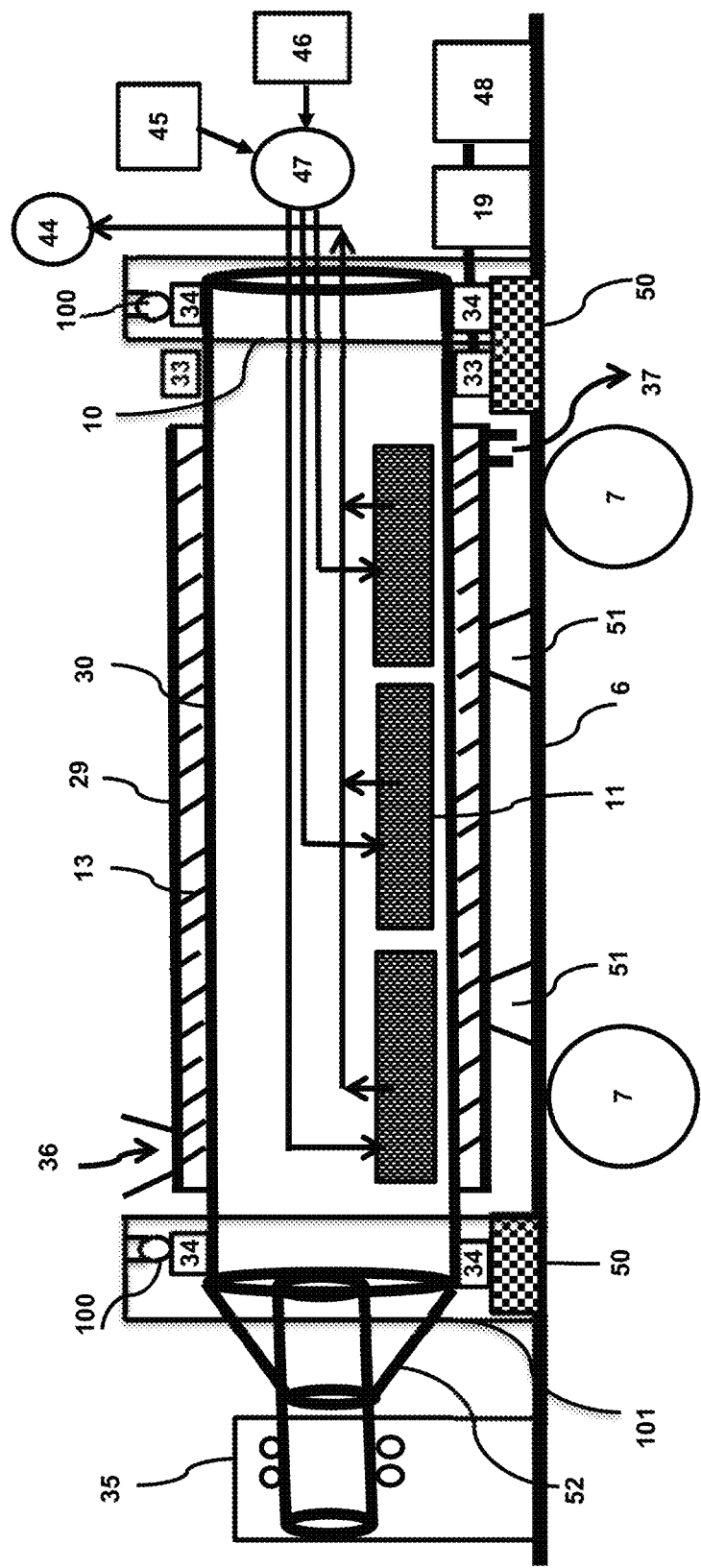
FIG. 15 is a schematic of an alternate HMA plant.

During material transfer with rotation of the inner drum, the inner drum (30) itself experiences lift-up of the whole inner drum due to accumulation of the helically forwarded materials underneath the drum. To prevent this, a single thrust roller (100) is facilitated on the top of the idler/tire (34) to push the inner drum in place. The thrust roller (100) maintains its position by the thrust roller supporting structure (101). The stationary roller supporter has feet firmly attached on the ground and/or frame (6) and has a top portion that arrests the thrust roller (100) tightly so as not allow the inner drum (30) to move vertically. FIG. 15 demonstrates this feature very well. The FIG. 15 is essentially same as FIG. 13, except using the thick inner drum that does not need the inside supporter of the inner drum (49). Additional trunnion rollers may be located at the two lower portions of the tire (34) on outside inner drum supporters (50). Two lower trunnion rollers may suffice to add support to the inner drum (30).

Figure 16:
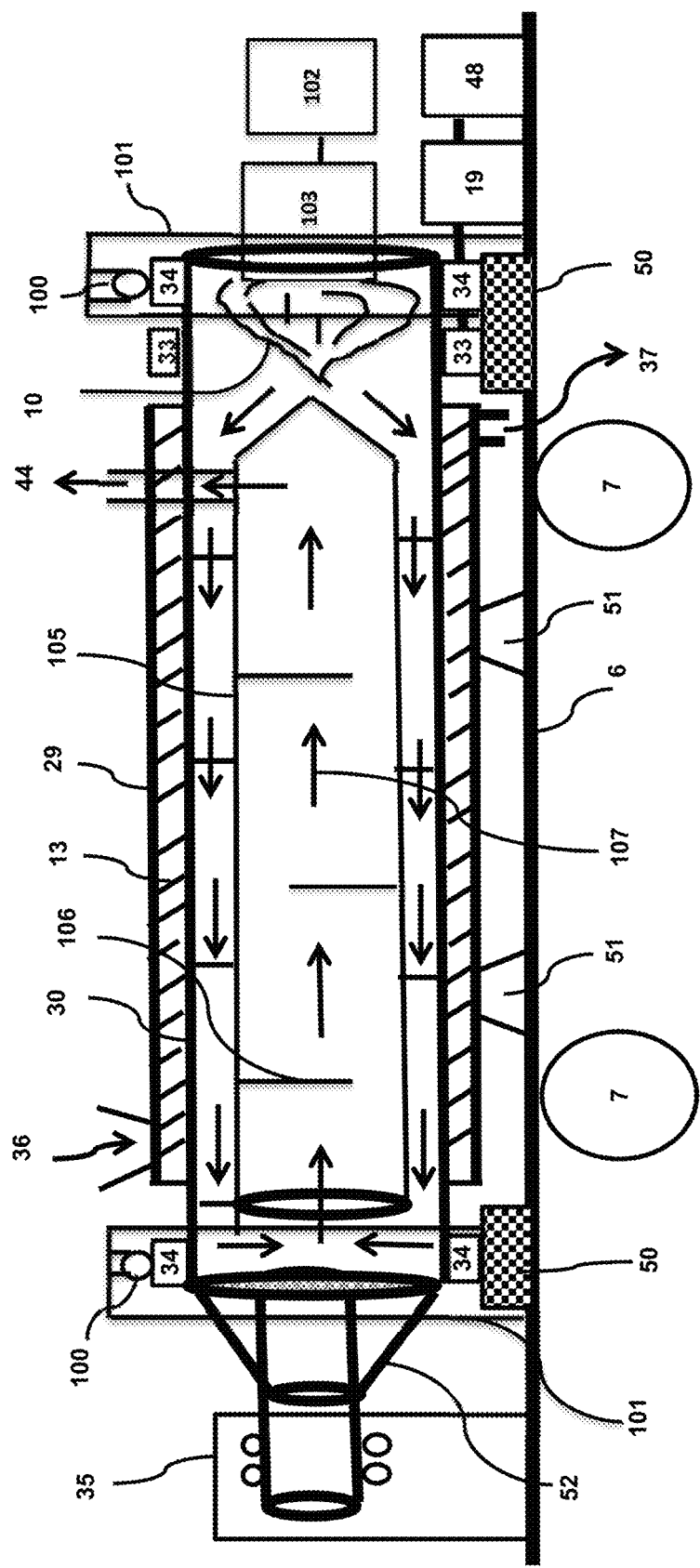
FIG. 16 is a schematic of another alternate HMA plant, utilizing an oil burner as a heat source.

In FIG. 16 as another embodiment of this invention, the heating element may also be changed to a single oil burner (103) from the surface combustion burner (11). The reason of using the traditional oil burner (103) is said to be the economically cheapest heating source available. Applying the oil burner (103) to the next generation producer (5) can have many different designs for hot air to pass through to heat materials indirectly. All different designs still belong to this invention. One example of the oil burner design is given in FIG. 16. While burning fuel supplied from fuel tank (102), oil burner (103) produces a flame (104) located within one end of the inner drum (30) and heats the ambient air (107) coming in. Hot ambient air (107) is forced to travel around the cylindrical chamber (105) provided at the inside of the inner drum (30) until the chamber length is ended and then it is redirected into the inside of the chamber (105) leading to the air exhaust. This design is to provide the hottest air entering at the inside of the inner drum to heat materials located at the outside of the wall in its first priority. The inner chamber (105) is baffled (106) to slow down the passage of the hot air (107) and promote greater heat transfer by increasing residence time of the air within the system. To protect the burner (103), at least one full screw may be positioned between the material exit and the end of the inner drum in a counter direction so as reverse material flow and direct materials towards the exit.

It is to be understood that other heating sources may be utilized and the plant is easily modified to accommodate such sources and the resultant plant will still fall within the purview of the invention. This would be currently available and future develops heat sources, such as Infrared, microwave, or any others.

Figure 17:
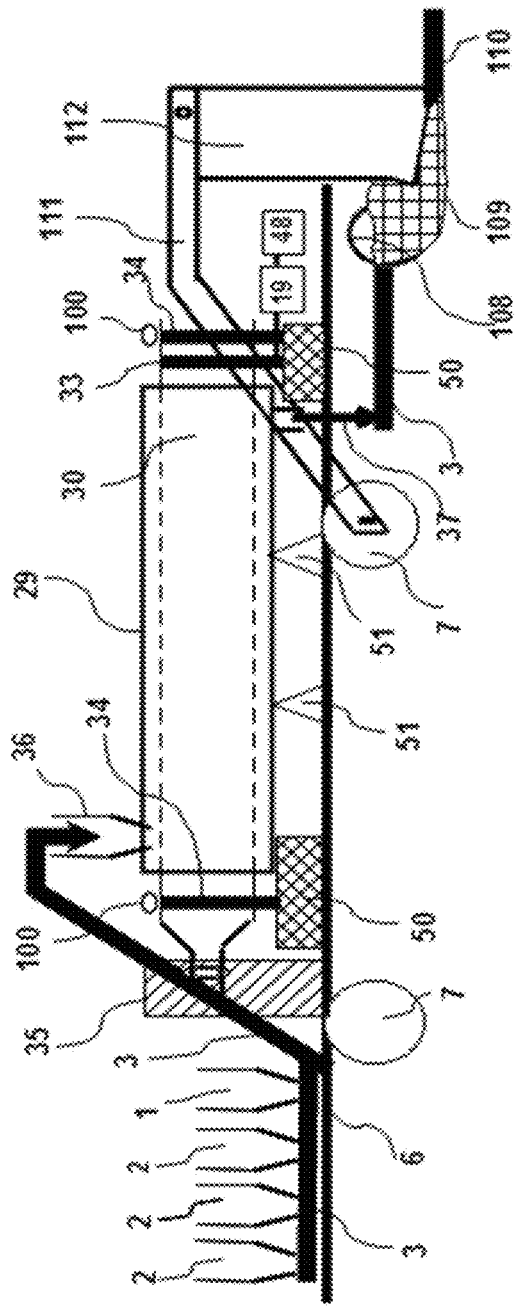
FIG. 17 is a schematic depicting a mobile HMA plant in combination with a paving machine.

An example of a mobile paving plant is shown in FIG. 17. Any HMA plant utilizing the principals of this invention may be joined or otherwise utilized with a conventional paving machine. A tow bar (111) in the mobile paving plant may connect the whole paving unit to mobile plant to move together. The mixed asphalt (37) produced from the HMA plant drops down on the belt conveyor (3) at the exit of the plant and the conveyor (3) transfers the hot mix to an augur (108) that spreads the arrived asphalt mix (109) to the specified paving width on the paving ground. When the hot mix asphalt (109) is accumulated enough between the auger (108) and the tamp or vibratory screed unit (112), the screed unit (112) tamps or vibrates to compress the loose hot asphalt mix (109) piled as moving along with the mobile plant. The compressed mix with a specified thickness is called asphalt mat (110) that is compacted with a vibratory steel roller to constitute the final asphalt pavements. The combination of the mobile plant and the whole paving units eliminates the unnecessary parts of a conventional paving machine and the construction distance between the mobile plant and the paving machine, prevents hot material cooling during transfer of the hot asphalt mix to the paving machine, and also excludes a paving machine operator.

The next generation HMA producer (28) claimed in this invention has many benefits and advantages over the existing producers. They are significant reduction of environmental pollution, no dust generation, excellent frictional shear mixing, effective indirect convective heating, fuel saving achieved by using a surface combustion burner, paving of the produced asphalt mix without a conventional paving machine and production of 100% RAP-recycled mixes. One obtains additional benefits of excellent performance properties obtained by adding organic chemical additives, substantially decreased construction cost, elimination of waste disposal fee, saving of virgin raw materials by using 100% RAP material.

In conclusion, the next generation HMA producer (28) constituting of rotational inner drum (30), stationary outer housing (29), segmented screw (or full screw) flights (31) and directional flights (32), sprocket with chain (33) and idler (34), thrust bearing assembly (35), paving units, and any heating source including surface combustion burner (11) becomes a truly next generation HMA plant. The reason is that such a plant creates unique technical breakthrough never achieved in the history of asphalt mix plants and solves limitations of the existing HMA producer.

INDUSTRIAL APPLICATION

The present invention has industrial applicability in producing the regular and the modified HMA (or WMA) products and up to 100% RAP (or ARS) recycled ones modified by a chemical additive or a rejuvenator, and disclosing apparatuses and methods for making such products.

I claim:

1. An HMA producer comprising:
   a. an outer housing having a material inlet on a top of one side and a material exit at a bottom of a side opposite and having an outer housing length;
   b. an inner drum having cylindrical shape with a diameter and capable of rotation within the outer housing, an end of the inner drum proximate the side of the outer housing by the material exit having an opening and the inner drum having an inner drum length;
   c. the inner drum and the outer housing having space there between, said space from proximate the material inlet to proximate the material outlet defining a material transfer chamber;
   d. at least one idler structure about a circumference of the inner drum, the at least one idler structure supporting the inner drum and further comprising:
      i. an idler tire about a circumference of the inner drum and having a width less than the half length of the inner drum;
      ii. at least two trunnion rollers contacting the idler tire underneath the inner drum;
      iii. a thrust roller contacting the top of the idler tire; and
      iv. a thrust roller support structure holding the thrust roller in contact with the top of the idler tire to stay in position
   d. a pipe with a smaller diameter than the inner drum, coaxially extending oppositely from the inner drum end proximate the material inlet, connected to said inner drum end by a conical connector whose one end connected to the end rim of the inner drum proximate the material inlet and the other end connected to the pipe body; and
   e. at least one stationary heating unit located inside the inner drum;
   wherein materials enter into the chamber through the material inlet and move through the chamber toward the material exit and the stationary heating unit indirectly heats the material through the inner drum while the material traverses the chamber and the thrust roller arrests vertical moments of the inner drum caused by an accumulation of material in a lower portion of the material transfer chamber.

2. The HMA producer of claim 1, the outer housing chosen as from a set of outer housing shapes consisting of: circular, a U-shaped trough, and a V-shaped trough.

3. The HMA producer of claim 1, further comprising a thrust bearing proximate the end of the pipe in order to arrest retraction movement of the inner drum as it pushes material forwardly towards the material exit.

4. The HMA producer of claim 1, the at least one idler structure further comprising two idler structures, one proximate each end of the inner drum, a sprocket-and-chain assembly positioned between the two idler structures, driving by a motor and a reducer to rotate the drum.

5. The HMA producer of claim 1, the inner drum further comprising at least one screw helically standing on the outside surface of the inner drum from proximate the material inlet to proximate the material exit, being positioned on the inner drum on a perpendicularly connecting line across a pitch between adjacent screw crests with a given interval along a given length of the inner drum;
   wherein the at least one screw and at least one directional flight transfer the materials from the material inlet to the material exit while simultaneously shearing, mixing, and heating the same by convection, all during inner drum rotation.

6. The HMA producer of claim 5, the screw representing the segmented screw flights spanning over the screw section with the at least one directional flight.

7. The HMA producer of claim 5, the screw representing the full screw spanning over the screw section with the at least one directional flight.

8. The HMA producer of claim 1, further comprising at least one directional flight being helically aligned on the inner drum, over an entire material transfer distance.

9. The HMA producer of claim 1, the inner drum further comprising at least one screw positioned between the material exit and an end of the inner drum, oriented in a manner to reverse material flow.

10. The HMA producer of claim 1, the at least one stationary heating unit being a surface combustion burner.

11. The HMA producer of claim 1, the at least one stationary heating unit being a microwave heating unit.

12. The HMA producer of claim 1, further comprising at least one additional stationary heating unit being located under an external lower portion of the outer housing.

13. The HMA producer of claim 12, the at least one additional stationary heating unit being selected from a set of heating units consisting of: surface combustion burners, hot oil circulation pipes, and residual hot air exhausted from the surface combustion burner and the conventional oil burner.

14. The HMA producer of claim 1, further comprising a gas purifier set connected nearby the material exit on an outside of the outer housing, the gas purifier set further comprising a heat exchanger, a diesel oxidation catalyst (DOC) and a blower wherein the heat exchanger collects and liquefies low volatile organic fumes and steams, the DOC eliminates any harmful gases evolved and the blower evacuates any gases and fumes from the outer housing.

15. A mobile paving system comprising the HMA producer of claim 14 in combination with paving units.

16. The HMA producer of claim 1, further comprising a frame and at least one wheel in order to make the producer mobile while also allowing the use of cold RAP generated on sites in producing the recycled HMA.

17. The HMA producer of claim 1, further comprising:
   a. the inner drum having an end of the inner drum proximate the side of the material exit having an inner drum opening, a cylindrical air-channel being defined within the inner drum while being closed towards the inner drum opening and having an opening proximate an end opposite the inner drum opening; and
   b. at least one stationary heating unit located proximate the inner drum opening to make hot air, said hot air from said heating unit traversing space outside of the air-channel to the air-channel opening, then traveling back through a baffled passage inside of the air-channel before exiting the HMA producer;
   wherein materials enter into the material transfer chamber through the material inlet and move through the chamber toward the material exit and the stationary heating unit indirectly heats the material through the inner drum during its transfer.

18. An HMA producer comprising:
   a. an outer housing having a material inlet on a top of one side and a material exit at a bottom of a side opposite;
   b. an inner drum located within the outer housing and having a length, an end of the inner drum proximate the material exit having an inner drum opening into an inner drum chamber defined therein, a cylindrical, baffled, air-channel being defined within the inner drum chamber, being closed proximate the inner drum opening and having an opening opposite the inner drum opening;

c. the inner drum and the outer housing having space therebetween, said space defining a material transfer chamber;

d. a pipe with a smaller diameter than the inner drum, coaxial with the inner drum and connected thereto by a conical connector at an end of the inner drum proximate the material inlet; and e. at least one stationary heating unit located proximate the inner drum opening, hot air from said heating unit traversing the total length of the inner drum within the inner drum chamber, then entering the air channel and traveling through the baffled air-channel before exiting the HMA producer;

wherein materials enter into the material transfer chamber through the material inlet and move through the material transfer chamber toward the material exit and the stationary heating unit indirectly heats the material through the inner drum while the material traverses the material transfer chamber.

19. The HMA producer of claim 18, the inner drum further comprising at least one screw positioned between the material exit and the heating unit, oriented in a manner to reverse material flow.

* * * * *